Sept. 30, 1958     F. G. CASTNER     2,853,856
HYDRAULIC BRAKE SAFETY DEVICE
Filed March 14, 1955
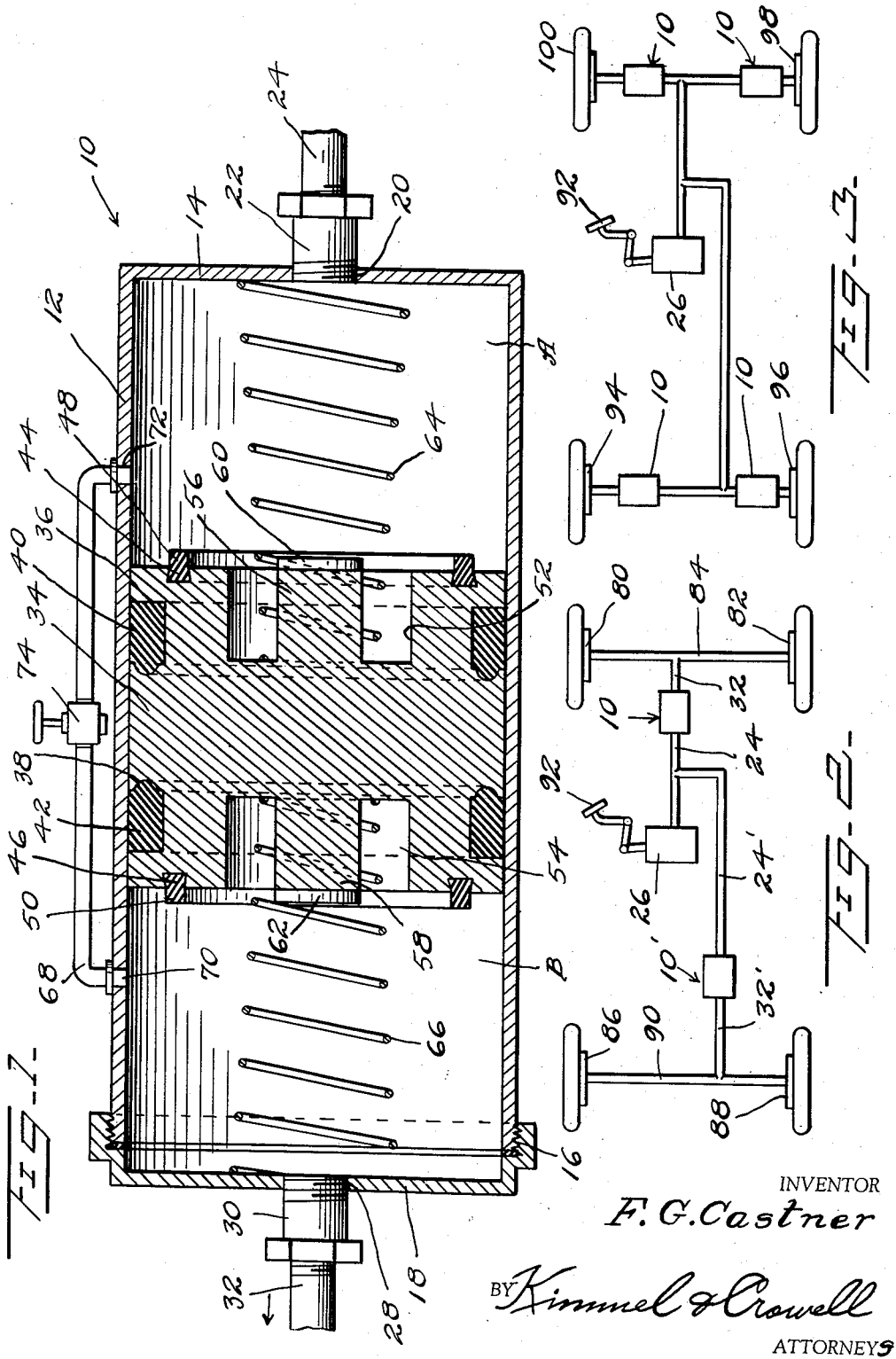
INVENTOR
*F. G. Castner*
BY *Kimmel & Crowell*
ATTORNEYS

United States Patent Office 2,853,856
Patented Sept. 30, 1958

2,853,856

HYDRAULIC BRAKE SAFETY DEVICE

Frank G. Castner, Bridgeport, Ohio, assignor to The Tirips Corporation, Steubenville, Ohio, a corporation of Ohio Application March 14, 1955, Serial No. 494,186

1 Claim. (Cl. 60—54.5)

This invention relates to hydraulic systems for automotive vehicles, and more specifically, the invention is directed to the provision of means for preventing the loss of the hydraulic fluid in all four of the hydraulically operated brakes in the event a leak occurs in the conventional hydraulic braking system.

In the conventional hydraulic braking systems commonly used on automobiles and other wheeled vehicles, the hydraulic brakes on each wheel are connected with a fluid from a master cylinder, and in the event one or more of the braking devices on the wheels develop leaks or are ruptured or broken, the hydraulic fluid is lost to the user of the vehicle. That is, the entire braking system becomes inoperative.

One of the primary objects of this invention is to provide means for limiting the leakage of the hydraulic fluid from any of the wheel braking cylinders whereby braking force may be effected on the undamaged braking cylinders.

A further object of this invention is to provide means whereby the hydraulic braking system of a motor vehicle is made positive in its braking action even though one or more brake cylinders have been rendered inoperative.

It is a still further object of this invention to provide a fluid control unit adapted to facilitate the filling of the hydraulic system in such a manner as to prevent the formation of air pockets which would interfere with the proper operation of the hydraulic system.

Other and further objects and advantages of the instant invention will become more evident from a consideration of the following specification when read in the light of the annexed drawing, in which:

Figure 1 is a medial longitudinal cross-sectional view of a safety device for a hydraulic brake system constructed in accordance with the teachings of this invention.

Figure 2 illustrates the application of a pair of control devices interposed between the master cylinder and a pair of hydraulic braking cylinders disposed on the front wheels, and a safety device interposed between the master cylinder and the brake cylinders of the rear wheels of the vehicle.

Figure 3 discloses the application of the safety device to each of the vehicle wheel brake cylinders.

Referring now more specifically to the drawing, reference numeral 10 designates, in general, a safety control device for the hydraulic systems of automotive vehicles.

As illustrated in Figure 1 of the drawing, the device comprises a substantially hollow cylindrical casing 12 having a closed end wall 14 and an oppositely disposed open end externally threaded at 16. A substantially cylindrical closure member 18 is internally threaded and is adapted for threaded engagement with the threads 16. The end wall 14 is provided with a substantially centrally disposed opening 20 having a fitting 22 connected through conduit 24 with the master cylinder 26 of the hydraulic system for an automotive vehicle.

The closure member 18 is provided with a centrally disposed aperture 28 which is adapted to receive a fitting 30 which connects through conduit 32 with individual hydraulically operated brake cylinders (as is illustrated in Figure 3) or with the front and rear pairs of vehicle brake cylinders, as is illustrated in Figure 2.

A piston 34 is mounted for reciprocation within the casing 12. The piston 34 comprises a substantially solid cylindrical member having a pair of circumferential recesses 36 and 38, respectively, formed therein, the recesses being positioned adjacent each end thereof. Sealing rings 40, 42 formed of rubber or other desirable material are disposed within the recesses 36, 38.

Each of the outer ends of the piston 34 are provided with circumferential dove-tail grooves 44, 46 which are adapted to receive shock absorbing and liquid sealing ring elements 48, 50 which project beyond each end of the piston 34 to form a function to be described below. The shock absorbing elements may be formed of rubber or other suitable resilient material.

Each end of the piston member 34 is provided with an inwardly extending annular groove 52, 54 and a pair of substantially cylindrical posts 56, 58, the outer ends of which are provided with cylindrical shock absorbing pads 60, 62. The inner end of a coil spring 64 is disposed within the annular recess 52 and surrounds the center post 56 which acts as a keeper therefor. The other end of the spring 64 is in abutting relationship with the end wall 14.

In a similar manner the inner end of a coil spring 66 is positioned within the annular groove 54 and engages around the center post 58 which acts as its keeper. The other end of the coil 66 abuts against the closure member 18.

A fluid by-pass is provided and comprises a conduit 68 having one of its ends 70 connected with the cylindrical wall 12 on one side of the piston 34, the other end 72 of the conduit 68 connecting with the other side of the piston 34 through the wall 12. A control valve 74 is disposed in the conduit 68 and is normally in its closed position.

In operation, let it be assumed that the safety device 10 has just been installed in the hydraulic system shown in Figure 2 of the drawing. As shown in Figure 2, the master cylinder 26 is connected by conduit 24 to one side of the piston 34. The valve 74 is turned to its open position and as the chamber A, defined by the end wall 14, the adjacent side of the piston 34, and that portion of the cylindrical casing 12 which extends therebetween, fills with hydraulic fluid, the fluid will pass through the end 72 of the conduit 68, the valve 74, and will enter the chamber B defined by the closure member 18, the other end of piston 34, and that portion of the casing 12 which extends therebetween.

After chamber B has been filled, the fluid passes through filling 30 and conduit 32 to enter the hydraulic brake operating devices 80, 82 on the rear wheels of an automotive vehicle, the passage being accomplished through the common pipe 84.

In a similar manner the master cylinder 26 is connected with the hydraulic brake operating devices 86, 88 through the conduit 24', safety control device 10', conduit 32', and the common pipe 90.

Assuming that the hydraulic system has now been set up, and assuming that the tension of the springs 64, 66 is such as to balance the piston 34 in the position shown in Figure 1, and assuming that the valve 74 has been turned to its closed position, pressure exerted by the brake pedal 92 will effect a pressure on the master cylinder 26 which is transmitted through the conduit 24 to the piston 34 forcing the piston to move laterally to the left as seen in Figure 1. This in turn induces pressure on the hydraulic fluid in chamber B which is, in turn, transmitted to the brake cylinders 80, 82 through the conduits 32 and 84. This is the normal operating procedure.

If, however, a rupture should occur in the pipe 84 or should the brake operating device develop an accidental leak, fluid will drain therefrom and from chamber B reducing pressure therein whereby the tension of spring 64 and the pressure exerted on the fluid in chamber A will force the piston 34 to move laterally to the left as viewed in Figure 1 of the drawing. This movement serves to prevent excessive loss of hydraulic fluid from the master cylinder 26 and maintains the hydraulic system, connected through line 24' with the master cylinder 26, in operative condition.

In Figure 3 of the drawing, the safety device has been illustrated as being connected with the hydraulic brake device for each wheel of the vehicle. In this hydraulic system, if any one of the hydraulic braking devices 94, 96, 98, or 100 proves to be faulty, the associated safety device 10 connected therewith will become immediately operative thereby preserving a hydraulic system for the braking devices of the other three wheels. The operation is identical to that described above and further elaboration thereon is not believed necessary.

The rubber seal ring 50 engaging against the closure member 18 and the pad 62 will engage across and close the inner end of the fitting 30. Thus no fluid will continue to flow from the master cylinder 26 to the conduit 32.

In addition to serving as a sealing means, the resilient ring 50 and the pad 62 will absorb some of the shock which would result from the sudden striking of the piston 34 to the closure member 18. The resilient member 48 and the pad 60 serve similar functions in the event of sudden loss of pressure on the hydraulic fluid disposed in chamber A.

Having described and illustrated one embodiment of this invention in detail, it will be understood that the same is offered merely by way of example, and that the invention is to be limited only by the scope of the following claim.

What is claimed is:

A fluid control unit comprising a cylindrical hollow casing, an end wall integrally formed at one end of said casing, a second end wall detachably secured to the opposite end of said casing, said end walls having respectively an axial outlet port and an axial inlet port formed therein, said casing having a by-pass port adjacent to but spaced from each of said end walls, a by-pass conduit extending between and connecting said by-pass ports, a cylindrical piston slidably positioned in said casing, said piston having a pair of oppositely disposed parallel faces arranged parallel to said end walls, said parallel faces each having a relatively deep annular groove formed centrally therein and defining axially extending center posts, said parallel faces each having a relatively shallow annular groove formed centrally therein with a diameter substantially greater than said relatively deep annular groove, a shock absorbing pad fixed to the outer end of each of said posts, a resilient shock absorbing and sealing ring seated in each of said shallow grooves, said piston having a pair of annular grooves formed in the cylindrical wall of said piston adjacent to but spaced from the parallel faces thereof, resilient sealing rings seated in said last named grooves, and a pair of coil springs each having one end engaged with one of said end walls and the opposite end encompassing said center posts engaging said pistons on opposite sides thereof at the base of said relatively deep annular grooves.

References Cited in the file of this patent

UNITED STATES PATENTS

| | | |
|---|---|---|
| 1,786,912 | Madden | Dec. 30, 1930 |
| 1,870,484 | Basta | Aug. 9, 1932 |
| 2,084,191 | Carroll | June 15, 1937 |
| 2,093,015 | Madden | Sept. 14, 1937 |
| 2,249,227 | Press | July 15, 1941 |
| 2,581,792 | Goodell | Jan. 8, 1952 |
| 2,746,252 | Reese | May 22, 1956 |

FOREIGN PATENTS

| | | |
|---|---|---|
| 704,748 | Germany | Apr. 5, 1941 |